(12) United States Patent
Sasaki (10) Patent No.: US 6,718,096 B2
(45) Date of Patent: Apr. 6, 2004

(54) COMPACT AND MULTIPLE OPTICAL FIBER COUPLER AND METHOD OF MAKING THE SAME

(75) Inventor: Hiroyuki Sasaki, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 09/940,104

(22) Filed: Aug. 27, 2001

(65) Prior Publication Data

US 2002/0168143 A1 Nov. 14, 2002

(30) Foreign Application Priority Data

May 8, 2001 (JP) .......................... 2001-137217

(51) Int. Cl.[7] .............................. G02B 6/26; G02B 6/12
(52) U.S. Cl. ........................................... 385/43; 385/46
(58) Field of Search ................... 385/41–43, 45, 385/51, 39, 31, 27

(56) References Cited

U.S. PATENT DOCUMENTS

| | | | | |
|---|---|---|---|---|
| 5,664,037 A | * | 9/1997 | Weidman ...................... | 385/46 |
| 5,682,453 A | * | 10/1997 | Daniel et al. .................. | 385/43 |
| 5,732,173 A | * | 3/1998 | Bylander et al. ............. | 385/45 |
| 5,802,224 A | * | 9/1998 | Okuta et al. .................. | 385/43 |

* cited by examiner

*Primary Examiner*—Tarifur R. Chowdhury
*Assistant Examiner*—Richard Kim
(74) *Attorney, Agent, or Firm*—David N. Lathrop, Esq.; Gallagher & Lathrop

(57) ABSTRACT

A compact and multiple optical fiber coupler in which plural fused-tapered coupler portions 13-1 and 13-2, which have plural optical fibers 11a-1, 11b-1, 11a-2 and 11b-2 to form optical couplers, are formed side by side on a common substrate 15 and the fused-tapered coupler portions formed integral with the substrate 15 are enclosed in a package 160.

2 Claims, 6 Drawing Sheets

COMPACT AND MULTIPLE OPTICAL FIBER COUPLER AND METHOD OF MAKING THE SAME

CROSS-REFERENCE TO A RELATED APPLICATION

This application claims priority benefits of a prior filed Japanese application number 2001-137217, filed May 8, 2001.

BACKGROUND OF THE INVENTION

The present invention relates to a compact and multiple optical fiber coupler and, more particularly, to a compact and multiple optical fiber coupler of the type that plural optical fiber couplers having their stripped portions fused to each other and drawn or tapered together are integrally joined to a common substrate and enclosed in the same package or capsule. The invention also pertains to a method of making the compact and multiple optical fiber coupler.

Figure 1:
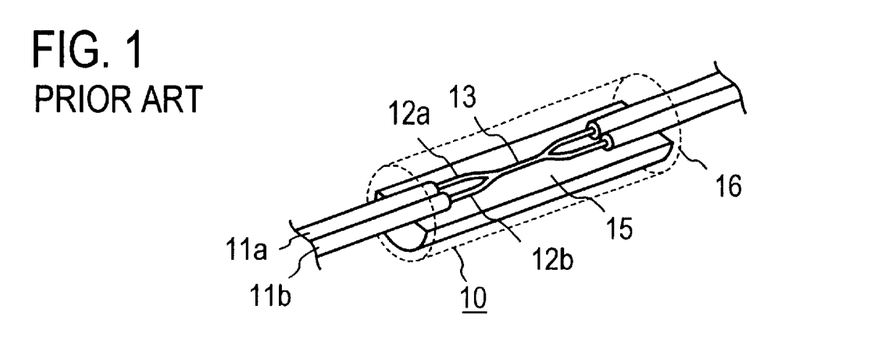
FIG. 1 is a diagram for explaining a conventional optical fiber coupler.
Figure 2A:
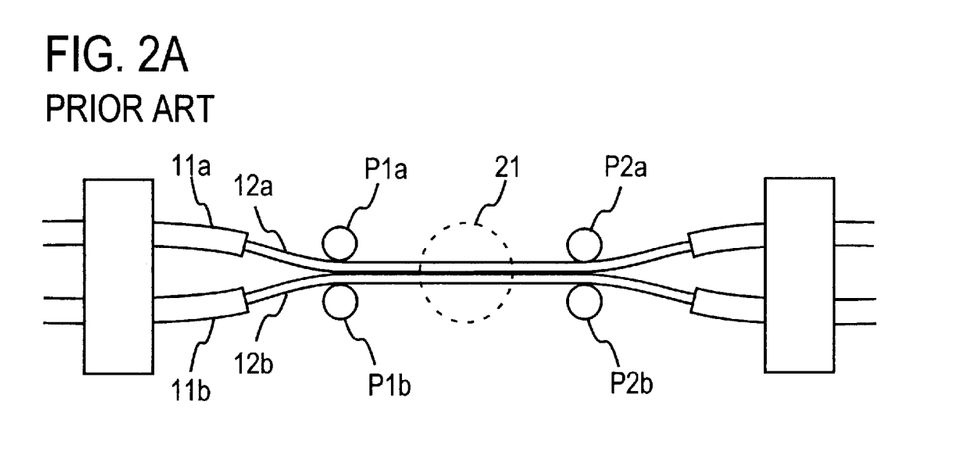
FIG. 2A is a diagram schematically depicting an example of an optical fiber fusing-tapering method.
Figure 2B:
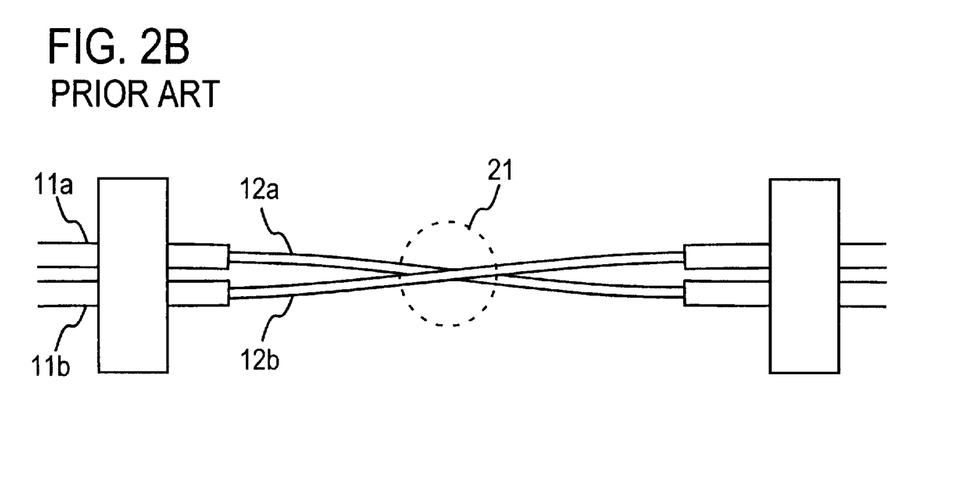
FIG. 2B is a diagram schematically depicting another example of an optical fiber fusing-tapering method.

A description will be given first, with reference to FIG. 1, of a prior art example which is a 2-by-2 fusion taper type optical fiber coupler indicated generally by 10. In FIG. 1, stripped portions 12a and 12b of two optical fibers 11a and 11b are first aligned in parallel contacting relation and then fused together and drawn or tapered to form a coupler portion 13, which is fixed onto the surface of a substrate 15, and the whole of the fused-tapered coupler portion 13 including the substrate 15 is enclosed in the same package or capsule 16. The stripped portions 12a and 12b are fused and drawn or tapered to form the fused-tapered coupler portion 13 by such a method as shown in FIG. 2A. That is, the stripped portions 12a and 12b of the pair of optical fibers 11a and 11b clamped in parallel relation are firmly gripped between two pairs of spaced-apart pins P1a, P1b and P2a, P2b so that they are aligned in parallel contacting relation, and the intermediate parallel contacting portions of the stripped optical fibers are fused together by heating with the flame 21 of a gas burner and tapered to form the coupler portion 13. Alternatively, the optical fibers 11a and 11b are arranged with their stripped portions 12a and 12b held in crossing relation and fusion-tapered into a coupler portion as shown in FIG. 2B.

Figure 3:
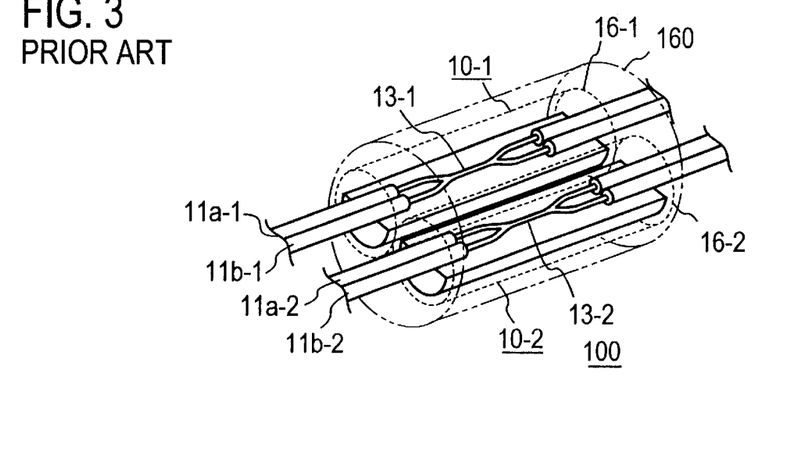
FIG. 3 is a diagram for explaining an example of a conventional multiple optical fiber coupler.

FIG. 3 shows an example of a two-in-one package optical fiber coupler in which two 2-by-2 fusion taper type optical fiber couplers 10-1 and 10-2, produced separately by the method described above with reference to FIG. 1, are enclosed in a common package or capsule 160.

Figure 4:
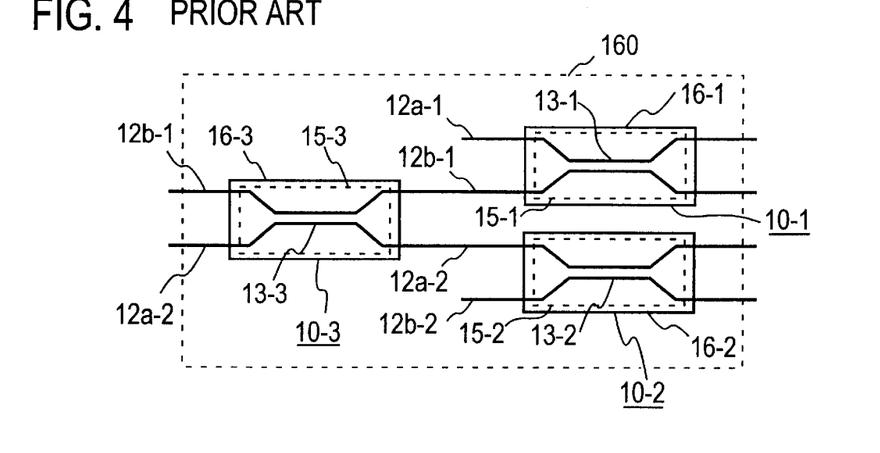
FIG. 4 is a diagram for explaining another example of a conventional multiple optical fiber coupler.

FIG. 4 schematically depicts another prior art example of a multiple optical fiber coupler, which is a 2-by-4 tree optical fiber coupler in which three 2-by-2 optical fiber couplers 10-1, 10-2 and 10-3 similar to that mentioned above in respect of FIG. 1 are enclosed in the package 160. The illustrated 2-by-4 tree optical fiber coupler is a multiple optical fiber coupler in which the fused-tapered coupler portions 13-1 and 13-2 of the two 2-by-2 optical fiber couplers 10-1 and 10-2 are arranged in parallel relation and inner adjacent stripped portions 12b-1 and 12a-2 are connected to stripped portions 12a-3 and 12b-3 of the 2-by-2 optical fiber coupler 10-3, respectively. This multiple optical fiber coupler is also enclosed in the common package or capsule 160.

Since the conventional multiple optical fiber coupler of FIG. 3 has a construction that the two 2-by-2 fusion taper type optical fiber couplers 10-1 and 10-2 enclosed in the packages 16-1 and 16-2, respectively, are housed in the one package 160, the outer dimension of the package 160 is larger than the outer dimension of the 2-by-2 optical fiber coupler 10 of FIG. 1, approximately twice in diameter. For example, the package 16 in FIG. 1 is about 3 mm in diameter and about 50 mm in length, whereas the package 160 in FIG. 3 is around 6 mm in diameter and around 50 mm in length.

Also in the case of the conventional multiple optical fiber coupler of FIG. 4 in which three 2-by-2 optical fiber couplers 10 each enclosed in the package 16 depicted in FIG. 1 are connected as described above, the package 160 is approximately twice larger than the individual package 16 in length as well as in diameter.

SUMMARY OF THE INVENTION

It is therefore an object of the present invention to provide a compact and multiple optical fiber coupler of the type that plural optical fiber couplers having their stripped portions fused together and tapered are integrally joined to the same substrate and enclosed in the same package so as to solve the above-mentioned problems of the prior art, and a method of making the compact and multiple optical fiber coupler.

The multiple optical fiber coupler according to the present invention comprises:

at least three optical fibers arranged adjacent one another;

at least two coupler portions formed by fusing and tapering at least two of said at least three optical fibers;

a substrate having fixedly arranged on one side thereof said at least two coupler portions; and a package for enclosing said at least two coupler portions and said substrate;

wherein said at least two optical fibers are extended out of said package from said at least two coupler portions enclosed in said package.

The method of making a multiple optical fiber coupler having at least two coupler portions according to the present invention comprises the steps of:

(a) arranging in parallel relation more than two optical fibers each having a stripped portion so that said stripped portions of a first pair of those adjacent ones of said more than two optical fibers contact with each other to form a first mating alignment portion and that said stripped portions of a second pair of those adjacent ones of said more than two optical fibers whose one optical fiber differs from one of the optical fibers of said first pair contact with each other to form a second mating alignment portion at a distance from said first mating alignment portion in the direction of extension of said more than two optical fibers, and clamping said more than two optical fibers at opposite sides of said stripped portions;

(b) simultaneously heating and drawing all of said more than two optical fibers in a first area containing said first mating alignment portion to fuse said first mating alignment portion to form a first coupler portion;

(c) simultaneously heating and drawing all of said more than two optical fibers in a second area containing said second mating alignment portion to fuse said second mating alignment portion to form a second coupler portion;

(d) fixing said stripped portions of all of said more than two optical fibers, including said first and second coupler portions, to one side of a common substrate; and (e) hermetically sealing said stripped portions, including said first and second coupler portions, and whole of said substrate in a package.

DETAILED DESCRIPTION OF THE PREFERRED EMBODIMENTS

Figure 5:
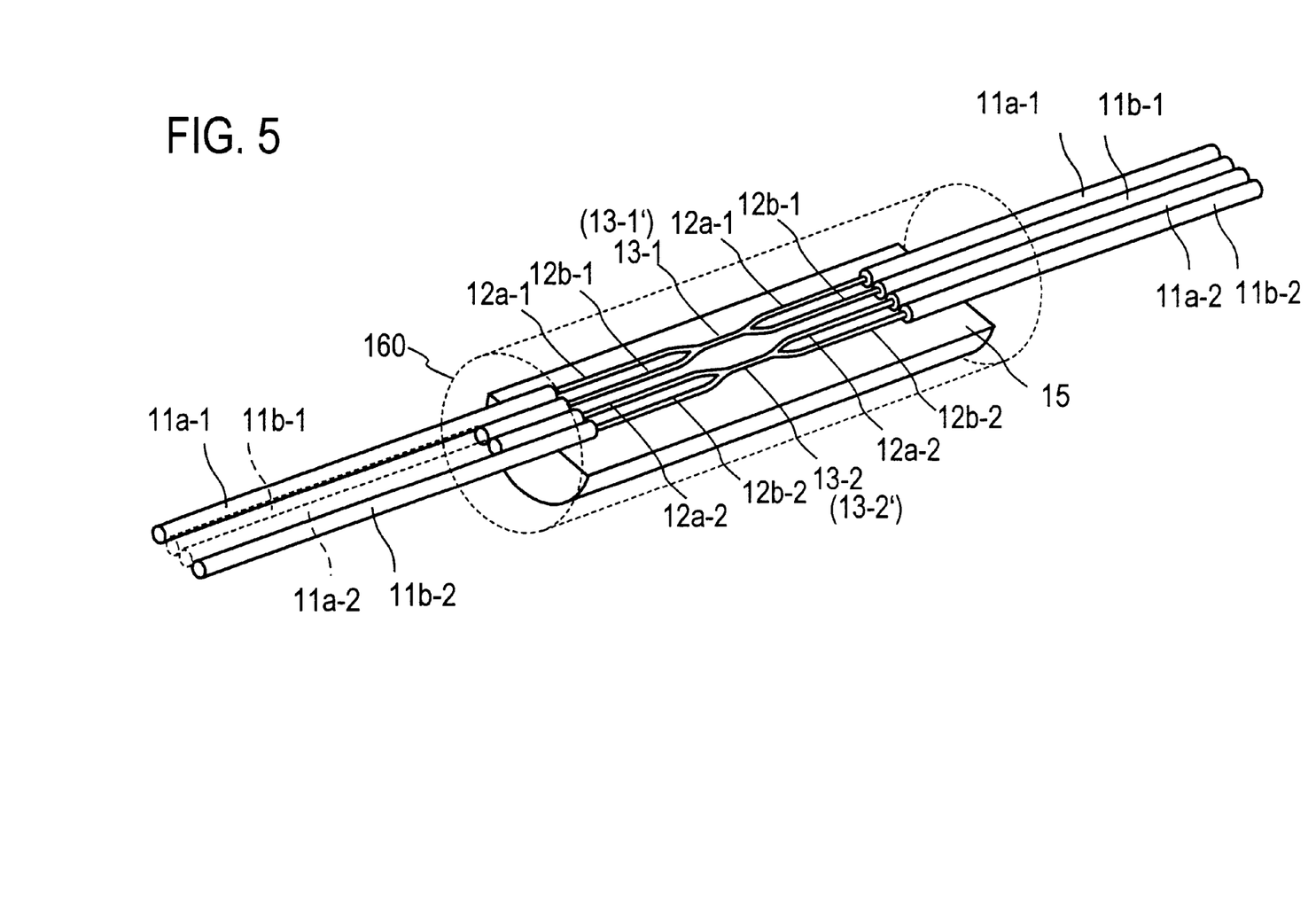
FIG. 5 is a diagram for explaining an embodiment of the present invention.

FIG. 5 schematically illustrates an embodiment of a 2-by-4 multiple optical fiber coupler according to the present invention. In this embodiment, two pairs of optical fibers 11a-1, 11b-1 and 11a-2, 11b-2 having stripped portions 12a-1, 12b-1 and 12a-2, 12b-2 of about the same length, which form two coupler portions 13-1 and 13-2, are aligned in parallel adjoining relation to each other and fixed as by adhesive bonding to a substrate 15 through the stripped portions 12a-1, 12b-1 and 12a-2, 12b-2 of the optical fibers, and these coupler portions 13-1 and 13-2, the stripped portions 12a-1, 12b-1 and 12a-2, 12b-2 and the substrate 15 is sealed in a package 160. The package 160 is, for instance, a molding of synthetic resin. Accordingly, the multiple optical fiber coupler of this embodiment differs from the conventional counterpart in that the plural coupler portions 13-1 and 13-2 are arranged on the same substrate 15 and that the coupler portions 13-1 and 13-2 and the substrate 15 are covered directly with one package 160.

Figure 6:
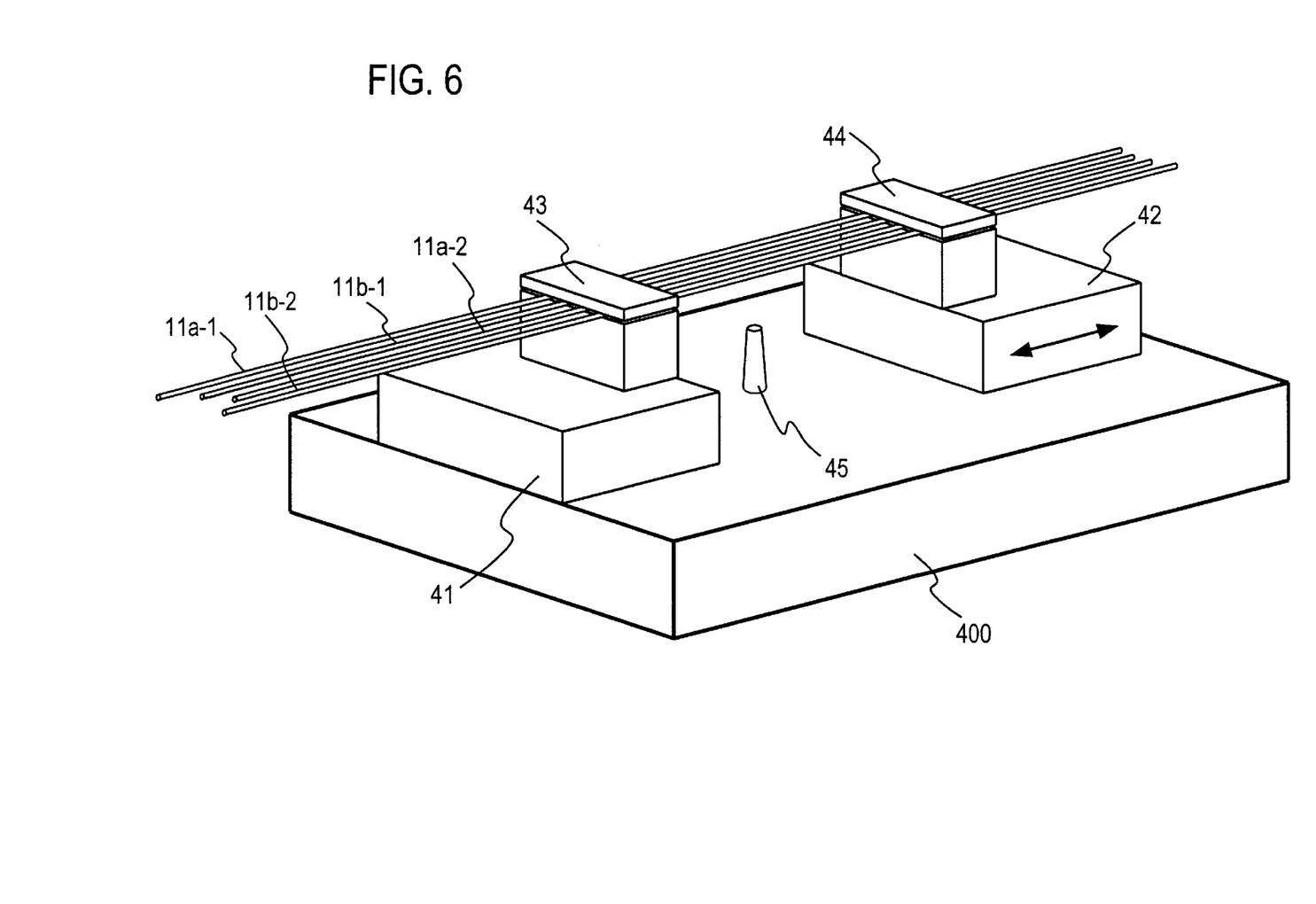
FIG. 6 is a diagram schematically showing an example of a fusing-tapering device for use in the present invention.

FIG. 6 schematically illustrates an example of a fusing-tapering device for fabricating the multiple optical fiber coupler of the present invention. The fusing-tapering device comprises a mount 400, clamp tables 41 and 42 mounted thereon, clamps 43 and 44 detachably fixed onto the clamp tables 41 and 42, respectively, and a gas burner 45. The clamp table 42 is adapted to be pulled away from the clamp table 41 with a predetermined amount of tension by a driver (not shown). In the illustrated embodiment, the gas burner 45 is disposed on the mount 400 at a position intermediate between the clamp tables 41 and 42, and four optical fibers 11a-1, 11b-1, 11a-2, 11b-2 are simultaneously heated by the flame of the gas burner 45. Of course, plural gas burners may be provided and used at the same time. In the clamping surfaces of the clamps 43 and 44 there are cut V grooves (not shown) for positioning optical fibers with a predetermined pitch determined according to the kind of the optical coupler to be made. Though not shown in FIG. 6, in the case of fusing and tapering the stripped optical fibers as depicted in FIG. 2A, the optical fibers can be displaced laterally by metal pins attached to jigs extended from the clamp tables 41 and 42 though not shown.

The fabrication of the multiple optical fiber coupler of the FIG. 5 embodiment starts with setting the four optical fibers 11a-1, 11b-1, 11a-2 and 11b-2 on the clamps 43 and 44 of the fusing-tapering device with the stripped optical fiber portions 12a-1, 12b-1, 12a-2 and 12b-2 aligned in parallel relation. At this time, the stripped optical fiber portions 12a-1 and 12b-1, 12a-2 and 12b-2 have their inner sides contacted, respectively, by metal pins (not shown) to form mating alignment portions 13-1' and 13-2', which are heat-fused by the burner 45 and, at the same time, tapered by pulling the clamp table 45 away from the clamp table 43 by a predetermined force to simultaneously form the fused-tapered coupler portions 13-1 and 13-2. Next, the optical fibers 11a-1, 11b-1, 11a-2 and 11b-2 are fixed to the substrate 15 with the coupler portions 13-1 and 13-2 and the stripped fiber portions 12a-1, 12b-1, 12a-2 and 12b-2 disposed on the substrate 15, after which the coupler portions 13-1 and 13-2, the stripped fiber portions 12a-1, 12b-1, 12a-2 and 12b-2 and the substrate 15 are sealed in the package 160. The substrate 15 is usually a glass substrate.

In more detail, the two mating alignment portions 13-1' and 13-2' are simultaneously fused and drawn or tapered so that the resulting coupler portions 13-1 and 13-2 have the same optical characteristic. To this end, the mating alignment portions 13-1' and 13-2' are formed in symmetrical positional relation, and one gas burner is used to symmetrically heat the both mating alignment portions 13-1' and 13-2' under the same thermal condition during fusion and tapering. Alternatively, two gas burners may be used to simultaneously heat the two adjacent mating alignment portions 13-1' and 13-2' under the same thermal condition. The fusion and tapering step is carried out while launching light into the input side of each optical fiber to be fused and tapered and measuring the quantity of light emitted from the output side of the optical fiber; the fusion and tapering step is stopped when the branching ratio of light reaches 50:50 in each of the fused-tapered coupler portions 13-1 and 13-2. The branching ratio may be set at other values.

Thereafter, the optical fibers 11a-1, 11b-1, 11a-2 and 11b-2 including the coupler portions 13-1 and 13-2 are fixedly joined to the substrate 15 by heat-fusing part of the substrate 15 or by an adhesive. Finally, the fused-tapered coupler portions 13-1 and 13-2 and the substrate 15, which form an integral whole, are enclosed in the same package 160. This packaging is preceded by the removal of the optical fibers for light launching use indicated by the broken lines in FIG. 5.

To provide the same optical characteristic for the fused-tapered coupler portions 13-1 and 13-2, the both mating alignment portions 13-1' and 13-2' need to be heated under the same thermal condition. In the case of using one burner 45 to heat the both mating alignment portions 13-1' and 13-2' under the same condition, the burner becomes larger than in the case of heating the pair of optical fibers shown in FIGS. 2A and 2B. However, since the use of a merely large burner results in an increase in the length over which the stripped fiber portions are drawn or tapered, it is desirable to design the burner so that flame may be limited in the length along the stripped fiber portions to be drawn but is large in the direction perpendicular to the stripped fiber portions. That is, a large burner is used so that the temperature for fusion by heating is not distributed over a wide area in the direction in which to draw the stripped fiber portions but is distributed over a wide area in the direction perpendicular to the direction in which to draw the stripped fiber portions and that the two stripped fiber portions to be fused and drawn or tapered are heated at the same temperature. To provide the same optical characteristic for the coupler portions 13-1 and 13-2, it is necessary that the four optical fibers be drawn by the same tensile force to place a uniform tension on the both mating alignment portions of the optical fibers.

Figure 7:
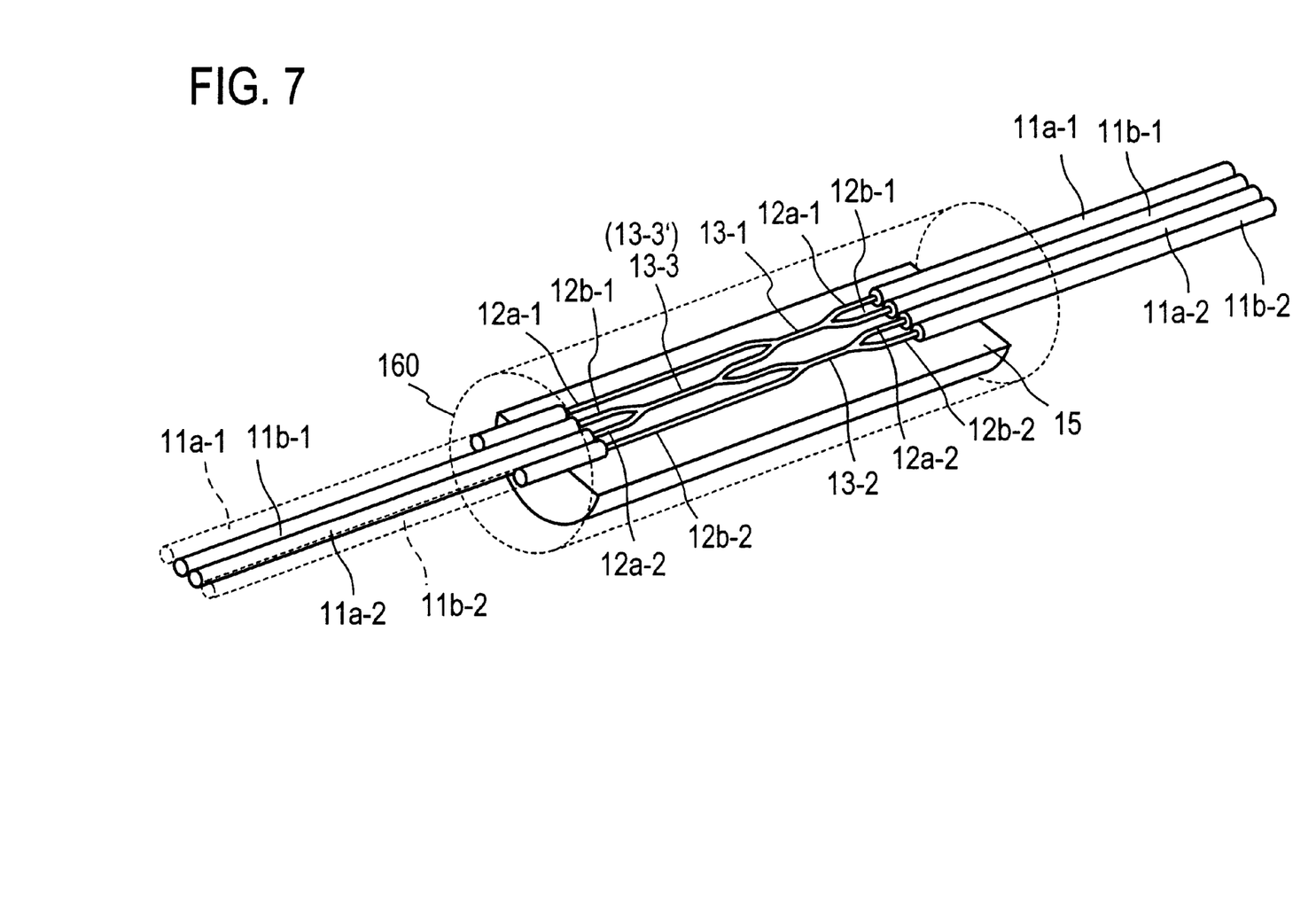
FIG. 7 is a diagram for explaining another embodiment of the present invention.

FIG. 7 illustrates another embodiment of the present invention which is a 2-by-4 tree optical fiber coupler similar to the prior art example depicted in FIG. 4. The stripped portions 12b-1 and 12a-2 of the optical fibers 11b-1 and 11a-2 at the incidence side form a coupler portion 13-3, and the stripped portions 12a-1 and 12b-1, 12a-2 and 12b-2 at the emission side similarly form coupler portions 13-1 and 13-2. The optical fibers 11a-1, 11b-1, 11a-2 and 11b-2 are fixed to the surface of the substrate 15 with the coupler portions 13-1, 13-2 and 13-3, the stripped fiber portions 12a-1, 12b-1, 12a-2 and 12b-2 disposed centrally of the substrate 15. Further, the substrate 15 and the optical fibers 11a-1, 11b-1, 1a-2 and 11b-2 are enclosed in the package 160.

Figure 8A:
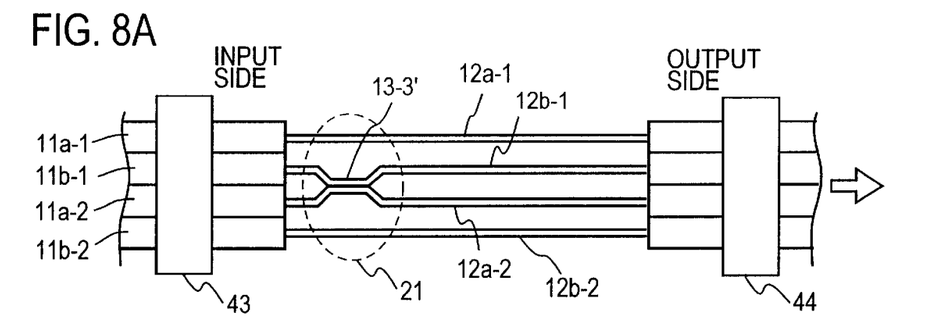
FIG. 8 is a diagram showing a sequence of steps involved in the manufacture of the multiple optical fiber coupler according to the present invention.

The fabrication of the multiple optical fiber coupler of FIG. 7 begins with setting the four optical fibers 11a-1, 11b-1, 11a-2 and 11b-2 on the clamps 43 and 44 of 44 of the fusing-tapering device shown in FIG. 6 with the stripped optical fiber portions 12a-1, 12b-1, 12a-2 and 12b-2 aligned in parallel relation as depicted in FIG. 8A. At this time, the stripped optical fiber portions 112b-1 and 12a-1 have their inner sides contacted by metal pins (not shown) to form a mating alignment portion 13-3'. The position of the left-hand clamp table 41 at the input side of the optical fibers clamped by the clamps 43 is fixed, and the right-hand clamp table 42 on which the optical fibers are clamped at the output side by clamp 44 is pulled in the direction of the arrow while simultaneously heating the mating alignment portion 13-3' and the stripped fiber portions 12b-1 and 12a-2 at the opposite sides thereof, by which the mating alignment portion 13-3' is fused and tapered to form the coupler portion 13-3.

The broken-line ellipse 21 indicates the area over which to heat the mating alignment portion concerned by the flame of the burner 45. The fusion and tapering step in FIG. 8A is carried out while launching light into the optical fiber 11b-1 from the input side, and the quantity of light emitted from the optical fibers 11b-1 and 11a-2 is monitored at the output side; and the fusion and tapering step is stopped when the branching ratio in the coupler portion 13-3 reaches 50:50. The branching ratio is not limited specifically to 50:50.

Figure 8B:
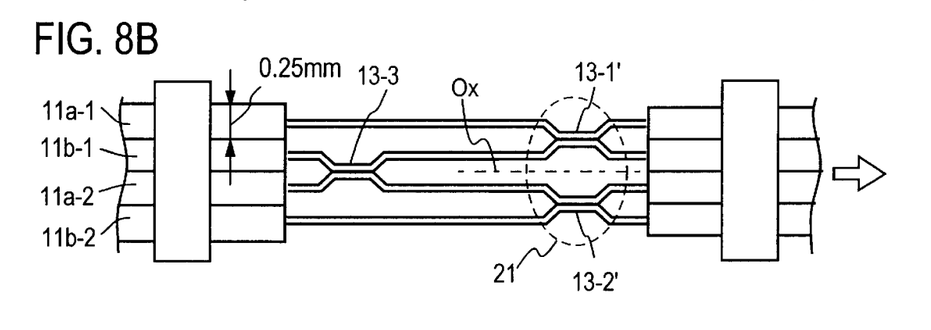

Next, as depicted in FIG. 8B, the stripped fiber portions 12a-1 and 12b-1 are gripped by metal pins into contact at some distance from the output side of the coupler portion 13-3 to form a mating alignment portion 13-1'. Similarly, the stripped fiber portions 12a-2 and 12b-1 are contacted into a mating alignment portion 13-2' in parallel with that 13-1'. These mating alignment portions 13-1' and 13-3' are simultaneously fused and tapered while being drawn in the direction of the arrow.

The broken-line ellipse 21 in FIG. 8B indicates the area over which to heat the mating alignment portion concerned by the burner. The mating alignment portions 13-1' and 13-2' are heated symmetrically with respect to their center line Ox. This fusing and tapering step is also carried out while launching light into the optical fibers 11a-1 and 11b-2 from the input side and measuring the quantity of light emitted from the optical fibers 11a-1, 11b-1, 11a-2 and 11b-2; and this step is stopped when the branching ratio reaches 50:50 in the fused-tapered coupler portions 13-1 and 13-2. The branching ration is not limited specifically to 50:50 but may also be set to some other values.

Figure 8C:
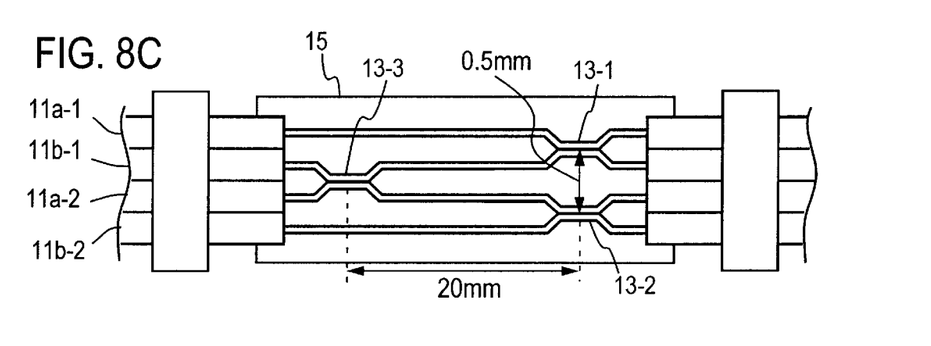

Next, as shown in FIG. 8C, the coupler portions 13-1, 13-2 and 13-3 and the stripped fiber portions 12a-1, 12b-1, 12a-2 and 12b-2 are mounted on and adhesive bonded to the substrate 15 together with the optical fibers 11a-1, 11b-1, 11a-2 and 11b-2. Prior to this step, the unnecessary portions of the optical fibers at the input side, indicated by he broken lines, are cut off.

Figure 8D:
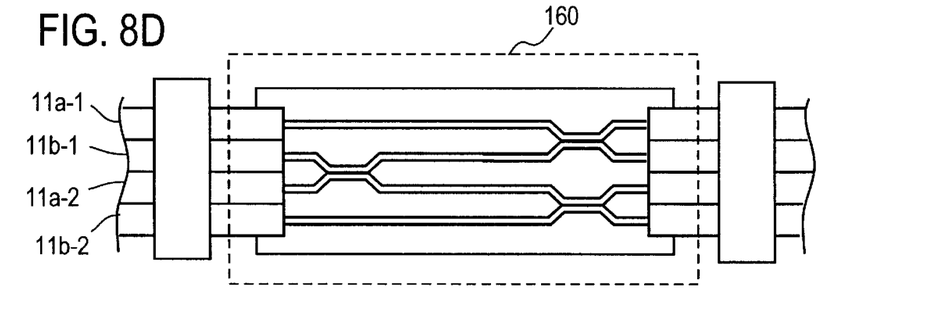

As depicted in FIG. 8D, the coupler portions, the stripped fiber portions and the clad optical fiber portions at their opposite sides and the substrate, forming an integral whole, are hermetically sealed by the package 160 to obtain the multiple optical fiber coupler.

In the above-mentioned step of FIG. 8A it is also possible to clamp first only the middle two optical fibers 11b-1 and 11a-2 and fuse and taper the mating alignment portion 13-3' into the coupler portion 13-3, followed by clamping the outer optical fibers 11a-1 and 11b-2 and performing the fusing and tapering step of FIG. 8B.

Figure 9:
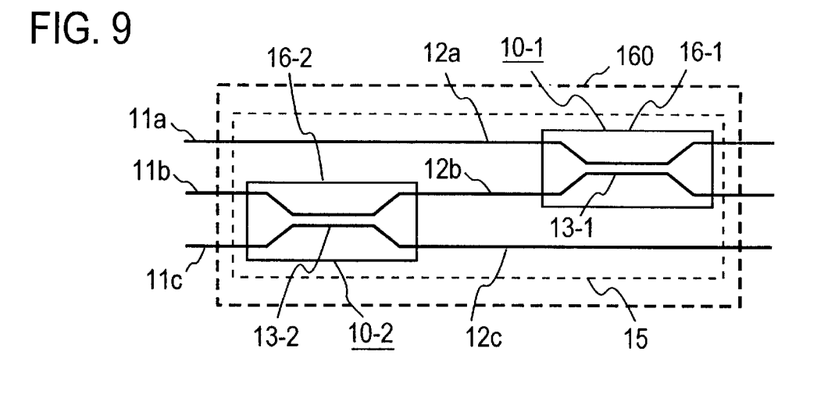
FIG. 9 is a diagram schematically illustrating still another embodiment of the present invention.

FIG. 9 schematically illustrates an embodiment of a multiple 3-by-3 optical fiber coupler according to the present invention. In this embodiment three optical fibers 11a, 11b and 11c, and coupler portions 13-1 and 13-2 are formed by the optical fibers 11a and 11b, and by 11b and 11c, respectively. The coupler portions 13-1 and 13-2 are fixed to the substrate 15 to form an integral whole, which is enclosed in the package 160. In the fabrication of the optical fiber coupler according to this embodiment, the two optical fibers forming the mating alignment portion, which will ultimately form the coupler portion 13-1, and one optical fiber 11c aligned in parallel to them are simultaneously heated and tapered, after which the two optical fibers forming the mating alignment portion corresponding to the coupler portion 13-2 and the adjoining optical fiber 11a are simultaneously heated and tapered. Alternatively, the two optical fibers 11a and 11b are fused and tapered to form the coupler portion 13-1, after which the two optical fibers 11b and 11c are fused and tapered to form the coupler portion 13-2.

Effect of the Invention

As described above, according to the present invention, since the optical fibers 11a-1, 11b-1, 11a-2 and 11b-2 are 0.25 mm in diameter as shown in FIG. 8C, the fused-tapered portions 13-1 and 13-2 are spaced 0.5 mm apart in the direction of the diameter of the package 160. The spacing between the fused-tapered portion 13-3 and those 13-1 and 13-2 in the lengthwise direction of the package 160 is 20 mm. Accordingly, the dimensions of the fused-tapered coupler portions and the substrate 15 to be enclosed in the package 160 are 0.25 mm×4=1 mm in the direction of its diameter and about 50 mm in its lengthwise direction. As referred to previously, the conventional package 16, which encloses one fused-tapered coupler portion 13 and the substrate 15 integral therewith, is around 3 mm in diameter and around 50 mm in length. Hence, the package 160 of the multiple optical fiber coupler according to the present invention is substantially equal in shape and size to the conventional package 16.

What is claimed is:

1. A multiple optical fiber coupler comprising:

first, second, third and fourth optical fibers arranged adjacent one to another;

a first coupler portion formed by fusing and tapering said first and second optical fibers;

a second coupler portion formed by fusing and tapering said third and fourth optical fibers, said first and second coupler portions being arranged side by side in the direction perpendicular to the direction of extension of said first and second optical fibers;

a substrate having fixedly arranged on one side thereof said first and second coupler portions; and a package for enclosing said at least two coupler portions and said substrate;

wherein said first, second, third and fourth optical fibers are extended out of said package from said first and second coupler portions enclosed in said package.

2. The optical fiber coupler of claim 1, further comprising a third coupler portion formed by fusing and tapering said second and third optical fibers at a distance from said first and second coupler portions in the direction of extension of said second and third optical fibers, said third coupler portion being fixed onto said substrate.

* * * * *

UNITED STATES PATENT AND TRADEMARK OFFICE
CERTIFICATE OF CORRECTION

PATENT NO.    : 6,718,096 B2
DATED         : April 6, 2004
INVENTOR(S)   : Hiroyuki Sasaki It is certified that error appears in the above-identified patent and that said Letters Patent is hereby corrected as shown below:

Column 8,
Line 7, insert claims 3 and 4:
-- 3. The optical fiber coupler of claim 1, wherein the first and second optical fibers are arranged immediately adjacent to one another, and third and fourth optical fibers are arranged immediately adjacent to one to another.
  4. The optical fiber coupler of claim 2, wherein the first and second optical fibers are arranged immediately adjacent to one another, and third and fourth optical fibers are arranged immediately adjacent to one to another. --

Signed and Sealed this

Twenty-eighth Day of September, 2004

JON W. DUDAS
*Director of the United States Patent and Trademark Office*